US009092697B2

(12) United States Patent (10) Patent No.: US 9,092,697 B2
Manson et al. (45) Date of Patent: Jul. 28, 2015

(54) IMAGE RECOGNITION SYSTEM AD METHOD FOR IDENTIFYING SIMILARITIES IN DIFFERENT IMAGES

(71) Applicant: Raytheon Company, Waltham, MA (US)

(72) Inventors: Steven James Manson, Tucson, AZ (US); Tara L. Trumbull, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 160 days.

(21) Appl. No.: 13/762,072

(22) Filed: Feb. 7, 2013

(65) Prior Publication Data

US 2014/0219569 A1    Aug. 7, 2014

(51) Int. Cl.
G06K 9/46    (2006.01)
G06K 9/62    (2006.01)
G06K 9/00    (2006.01)

(52) U.S. Cl.
CPC .......... G06K 9/6267 (2013.01); G06K 9/00536 (2013.01); G06K 9/6201 (2013.01); G06K 9/46 (2013.01)

(58) Field of Classification Search
CPC ........ G01C 21/20; G06T 11/00; G06T 15/00; G06T 2207/10024; G06T 7/0028; G06T 7/0083; G06T 9/20; G06T 11/006; G06T 7/0002; G06T 7/2033; G06F 17/30256; G06K 9/6255; G06K 9/2054; G06K 9/6267; G01R 33/5615; G03F 7/2022; H01J 37/3026; G01S 3/802; G01S 5/0252; G01S 5/08; G01S 5/04; G01S 13/46; G08G 5/045; H04K 3/45; G06G 7/22; H04W 36/0083; H04W 64/006

USPC ............ 382/124, 128, 276, 294, 201; 342/52, 342/54, 451; 345/204, 505, 582, 589
See application file for complete search history.

(56) References Cited

U.S. PATENT DOCUMENTS 4,276,570 A    6/1981    Burson et al.
4,899,161 A    2/1990    Morin, Jr. et al.
(Continued)

FOREIGN PATENT DOCUMENTS

EP    0431892 A2    6/1991
WO    WO-2005060466 A2    7/2005
(Continued)

OTHER PUBLICATIONS

"International Application Serial No. PCT/US2013/073556, International Search Report mailed Mar. 21, 2014", 4 pgs.
(Continued)

*Primary Examiner* — Barry Drennan
*Assistant Examiner* — Aklilu Woldemariam
(74) *Attorney, Agent, or Firm* — Schwegman Lundberg & Woessner, P.A.

(57) ABSTRACT

Embodiments for determining the similarity of different images are generally described herein. In some embodiments, image features of different images are converted to clusters, the clusters from each image are sorted based on one or more attributes of the clusters, and a plurality of three-point sets are generated for each image from a selected portion of the sorted clusters. Each three-point set defines a triangle. Matching triangles may be identified from the different images. The corresponding clusters of the matching triangles represent corresponding image features providing for a measure of the similarity of the two different images.

18 Claims, 9 Drawing Sheets

(56) References Cited

U.S. PATENT DOCUMENTS

| | | | |
|---|---|---|---|
| 5,943,056 A * | 8/1999 | Sato et al. | 345/419 |
| 6,128,407 A * | 10/2000 | Inoue et al. | 382/167 |
| 6,173,275 B1 | 1/2001 | Caid et al. | |
| 6,281,904 B1 * | 8/2001 | Reinhardt et al. | 345/582 |
| 6,292,136 B1 * | 9/2001 | Egnell | 342/432 |
| 6,456,956 B1 * | 9/2002 | Xiong | 702/115 |
| 6,628,805 B1 | 9/2003 | Hansen | |
| 6,647,146 B1 * | 11/2003 | Davison et al. | 382/199 |
| 6,910,657 B2 | 6/2005 | Schneider | |
| 6,959,119 B2 | 10/2005 | Hawkins et al. | |
| 6,993,167 B1 | 1/2006 | Skladnev et al. | |
| 7,032,858 B2 | 4/2006 | Williams | |
| 7,162,063 B1 | 1/2007 | Craine et al. | |
| 7,236,121 B2 | 6/2007 | Caber | |
| 7,260,480 B1 | 8/2007 | Brown et al. | |
| 7,319,877 B2 * | 1/2008 | Krumm et al. | 455/456.3 |
| 7,400,291 B2 * | 7/2008 | Xu et al. | 342/118 |
| 7,551,121 B1 | 6/2009 | O'Connell et al. | |
| 7,574,031 B2 | 8/2009 | Dehmeshki | |
| 7,657,101 B2 | 2/2010 | Christiansen, II et al. | |
| 8,144,947 B2 * | 3/2012 | Kletter | 382/124 |
| 8,194,952 B2 | 6/2012 | Mertz et al. | |
| 8,194,993 B1 * | 6/2012 | Chen et al. | 382/254 |
| 8,321,070 B2 | 11/2012 | Manson et al. | |
| 8,554,016 B2 | 10/2013 | Manson | |
| 2001/0037191 A1 * | 11/2001 | Furuta et al. | 703/6 |
| 2002/0042723 A1 | 4/2002 | Rice et al. | |
| 2002/0181783 A1 * | 12/2002 | Shiiyama | 382/217 |
| 2002/0191028 A1 | 12/2002 | Senechalle et al. | |
| 2003/0026503 A1 | 2/2003 | Kallergi et al. | |
| 2003/0181790 A1 | 9/2003 | David et al. | |
| 2004/0012638 A1 | 1/2004 | Donnelli et al. | |
| 2004/0093166 A1 | 5/2004 | Kil | |
| 2004/0156535 A1 * | 8/2004 | Goldberg et al. | 382/115 |
| 2004/0161141 A1 | 8/2004 | Dewaele | |
| 2004/0217962 A1 | 11/2004 | Lewis et al. | |
| 2004/0264749 A1 | 12/2004 | Skladnev et al. | |
| 2004/0267102 A1 | 12/2004 | Skladnev et al. | |
| 2005/0119551 A1 | 6/2005 | Maschke | |
| 2005/0180657 A1 | 8/2005 | Zhang et al. | |
| 2005/0190980 A1 | 9/2005 | Bright | |
| 2005/0232474 A1 | 10/2005 | Wei et al. | |
| 2006/0002632 A1 | 1/2006 | Fu et al. | |
| 2006/0036412 A1 | 2/2006 | Takatsuka | |
| 2006/0061598 A1 * | 3/2006 | Mino et al. | 345/629 |
| 2006/0120620 A1 | 6/2006 | Bassi et al. | |
| 2006/0153431 A1 | 7/2006 | Ando | |
| 2006/0204053 A1 * | 9/2006 | Mori et al. | 382/118 |
| 2006/0221779 A1 * | 10/2006 | Matsushita et al. | 369/30.01 |
| 2006/0227385 A1 | 10/2006 | Kawada | |
| 2006/0259509 A1 | 11/2006 | Stolte et al. | |
| 2006/0291708 A1 | 12/2006 | Dehmeshki et al. | |
| 2007/0050104 A1 | 3/2007 | Wallace et al. | |
| 2007/0053561 A1 | 3/2007 | Corrion | |
| 2007/0064989 A1 | 3/2007 | Chhibber et al. | |
| 2007/0146378 A1 * | 6/2007 | Sorgard et al. | 345/581 |
| 2007/0182762 A1 | 8/2007 | Wu et al. | |
| 2007/0231822 A1 * | 10/2007 | Mitas | 435/6 |
| 2007/0268280 A1 | 11/2007 | Fujita et al. | |
| 2008/0049976 A1 * | 2/2008 | Isomura et al. | 382/106 |
| 2008/0089590 A1 * | 4/2008 | Isomura et al. | 382/217 |
| 2009/0010509 A1 | 1/2009 | Zhou et al. | |
| 2009/0084977 A1 * | 4/2009 | Mack et al. | 250/423 R |
| 2009/0196475 A1 | 8/2009 | Demirli et al. | |
| 2009/0304243 A1 | 12/2009 | Mertz et al. | |
| 2009/0324026 A1 * | 12/2009 | Kletter | 382/124 |
| 2009/0327890 A1 | 12/2009 | Mertz et al. | |
| 2010/0111387 A1 | 5/2010 | Christiansen, II et al. | |
| 2010/0174707 A1 * | 7/2010 | Kudo et al. | 707/723 |
| 2010/0291912 A1 | 11/2010 | Tafarrodi et al. | |
| 2012/0114202 A1 * | 5/2012 | Manson | 382/128 |

FOREIGN PATENT DOCUMENTS

| | | |
|---|---|---|
| WO | WO-2008064120 A2 | 5/2008 |
| WO | WO-2009148596 A1 | 12/2009 |
| WO | WO-2009158001 A1 | 12/2009 |
| WO | WO-2012064400 A1 | 5/2012 |
| WO | WO-2014123619 A1 | 8/2014 |

OTHER PUBLICATIONS

"International Application Serial No. PCT/US2013/073556, Written Opinion mailed Mar. 21, 2014", 5 pgs.

Ansari, Nirwan, et al., "Partial Shape Recognition: A Landmark-Based Approach", *IEEE Transactions on Pattern Analysis and Machine Intelligence*, 12(5), (1990), 470-483.

Ansari, Nirwan, et al., "Recognizing partially occluded objects by a bidirectional associative memory neural network", *Optical Engineering*, 32(7), (1993), 1539-1548.

"U.S. Appl. No. 12/147,081, Response filed May 11, 2012 to Final Office Action mailed Feb. 16, 2012 and Advisory Action mailed Apr. 25, 2012", 13 pgs.

"U.S. Appl. No. 12/147,081, Advisory Action mailed Apr. 25, 2012", 2 pgs.

"U.S. Appl. No. 12/147,081, Final Office Action mailed Feb. 16, 2012", 20 pgs.

"U.S. Appl. No. 12/147,081, Non Final Office Action mailed Sep. 16, 2012", 22 pgs.

"U.S. Appl. No. 12/147,081, Response filed Apr. 16, 2012 to Final Office Action mailed Feb. 16, 2012", 13 pgs.

"U.S. Appl. No. 12/147,081, Response filed Dec. 12, 2011 to Non Final Office Action mailed Sep. 13, 2011", 13 pgs.

"U.S. Appl. No. 12/467,750, Amendment and Reply filed Jun. 27, 2012 to Non-Final Office Action mailed Jun. 8, 2012", 13 pgs.

"U.S. Appl. No. 12/467,750, Non-Final Office Action mailed Jun. 8, 2012", 11 pgs.

"U.S. Appl. No. 12/467,750, Notice of Allowance mailed Aug. 8, 2012", 7 pgs.

"U.S. Appl. No. 12/943,156, Non Final Office Action mailed Mar. 7, 2013", 8 pgs.

"U.S. Appl. No. 12/943,156, Notice of Allowance mailed Jun. 5, 2013", 9 pgs.

"U.S. Appl. No. 12/943,156, Response filed Apr. 24, 2013 to Non Final Office Action mailed Mar. 7, 2013", 12 pgs.

"European Application Serial No. 09758760.4, Office Action mailed Jan. 18, 2011", 2 pgs.

"International Serial No. PCT/US2011/51182, International Preliminary Report mailed May 23, 2013", 8 pgs.

"U.S. Appl. No. 12/133,163, Response filed Nov. 23, 2011 to Non Final Office Action mailed Sep. 26, 2011", 17 pgs.

"U.S. Appl. No. 12/133,163 Notice of Allowance mailed Feb. 9, 2012", 11 pgs.

"U.S. Appl. No. 12/133,163, Non Final Office Action mailed Sep. 26, 2011", 10 pgs.

"U.S. Appl. No. 12/147,081, Preliminary Amendment filed Sep. 26, 2011", 10 pgs.

"International Application Serial No. PCT/US2009/003386, Search Report mailed Aug. 4, 2009", 3 pgs.

"International Application Serial No. PCT/US2009/003386, Written Opinion mailed Aug. 4, 2009", 7 pgs.

"International Application Serial No. PCT/US2009/003773, Search Report mailed Aug. 12, 2009", 2 pgs.

"International Application Serial No. PCT/US2009/003773, Written Opinion mailed Aug. 12, 2009", 6 pgs.

"International Serial No. PCT/US2011/51182, Search Report mailed Jan. 26, 2012", 2 pgs.

"International Serial No. PCT/US2011/51182, Written Opinion mailed Jan. 26, 2012", 6 pgs.

"U.S. Appl. No. 12/147,081, Final Office Action mailed Nov. 8, 2013", 20 pgs.

"U.S. Appl. No. 12/147,081, Non Final Office Action mailed Mar. 13, 2014", 20 pgs.

"U.S. Appl. No. 12/147,081, Non Final Office Action mailed Apr. 26, 2013", 20 pgs.

(56) References Cited

OTHER PUBLICATIONS

"U.S. Appl. No. 12/147,081, Response filed Feb. 7, 2014 to Final Office Action mailed Nov. 8, 2013", 14 pgs.
"U.S. Appl. No. 12/147,081, Response filed Jul. 11, 2014 to Non Final Office Action mailed Mar. 13, 2014", 13 pgs.
"U.S. Appl. No. 12/147,081, Response filed Aug. 1, 2013 to Non Final Office Action mailed Apr. 26, 2013", 13 pgs.
"European Application Serial No. 09770539.6, Supplementary European Search Report mailed Apr. 4, 2014", 7 pgs.
"International Application Serial No. PCT/US2009/003386, International Preliminary Report on Patentability mailed Dec. 16, 2010", 9 pgs.
"International Application Serial No. PCT/US2009/003773, International Preliminary Report on Patentability mailed Jan. 13, 2011", 6 pgs.

* cited by examiner

HIGH RESOLUTION IMAGE

LOW RESOLUTION, ROTATED IMAGE

| x | y | w |
|---|---|---|
| 129 | 83 | 1203 |
| 278 | 128 | 430 |
| 370 | 339 | 388 |
| 378 | 372 | 822 |
| 383 | 354 | 323 |
| 408 | 313 | 852 |
| 409 | 333 | 385 |
| 413 | 337 | 371 |
| 454 | 346 | 891 |
| 471 | 333 | 328 |
| 494 | 324 | 527 |
| 497 | 330 | 523 |

FIG. 2E

| x | y | w |
|---|---|---|
| 129 | 83 | 1203 |
| 454 | 346 | 891 |
| 408 | 313 | 852 |
| 378 | 372 | 822 |
| 494 | 324 | 527 |
| 497 | 330 | 523 |
| 278 | 128 | 430 |
| 370 | 339 | 388 |
| 409 | 333 | 385 |
| 413 | 337 | 371 |
| 471 | 333 | 328 |
| 383 | 354 | 323 |

FIG. 2G

| x | y | w |
|---|---|---|
| 26 | 39 | 1243 |
| 40 | 84 | 452 |
| 94 | 123 | 888 |
| 97 | 149 | 571 |
| 100 | 149 | 561 |
| 101 | 111 | 432 |
| 101 | 123 | 392 |
| 101 | 124 | 414 |
| 101 | 142 | 351 |
| 101 | 137 | 903 |
| 104 | 137 | 903 |
| 106 | 115 | 357 |
| 113 | 115 | 823 |

FIG. 2F

| x | y | w |
|---|---|---|
| 26 | 39 | 1243 |
| 104 | 137 | 903 |
| 94 | 123 | 888 |
| 113 | 115 | 823 |
| 97 | 149 | 571 |
| 100 | 149 | 561 |
| 40 | 84 | 452 |
| 101 | 111 | 432 |
| 101 | 124 | 414 |
| 101 | 123 | 392 |
| 106 | 115 | 357 |
| 101 | 142 | 351 |

FIG. 2H

HIGH RESOLUTION IMAGE

LOW RESOLUTION, ROTATED IMAGE

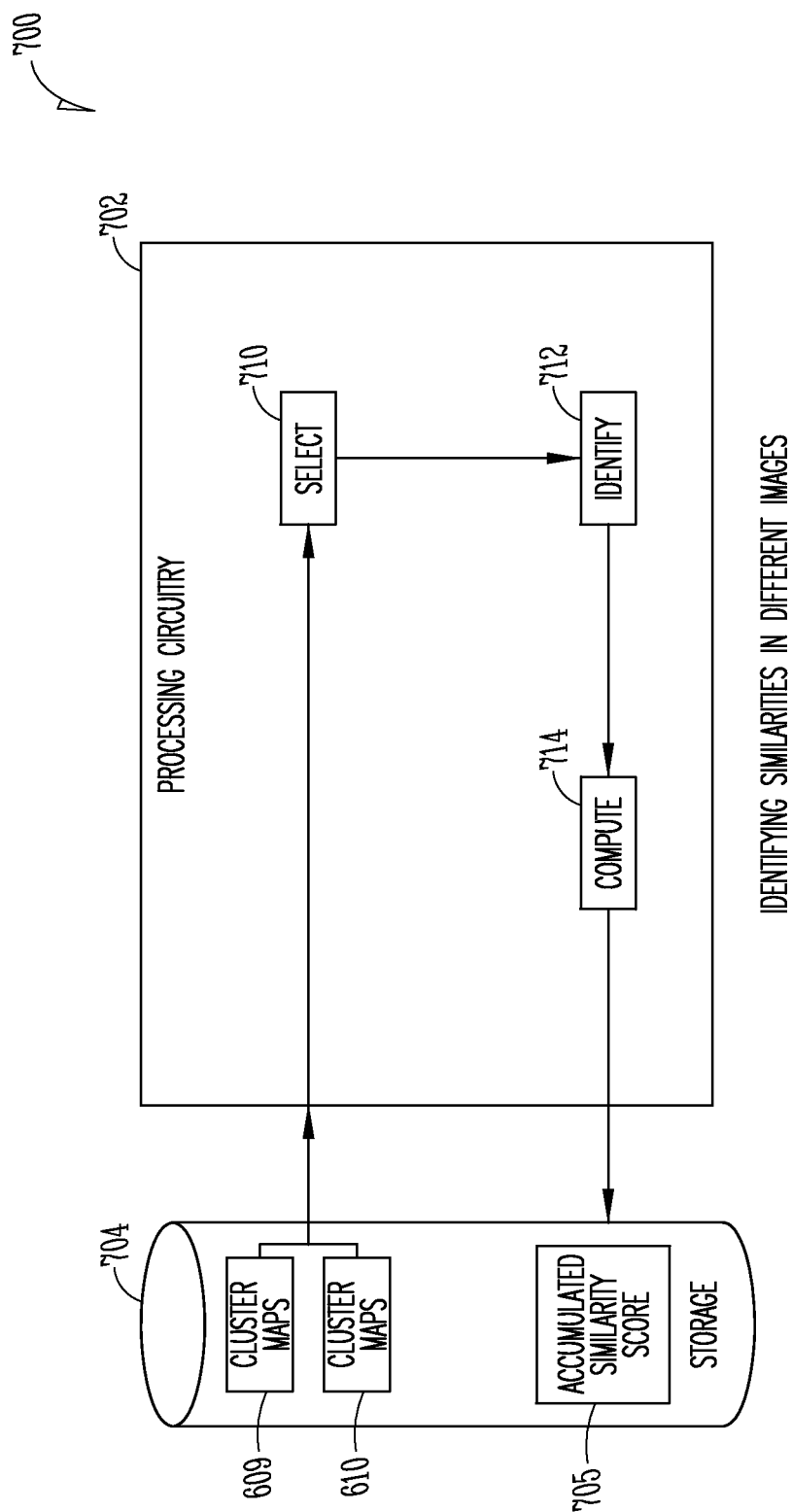

IMAGE RECOGNITION SYSTEM AND METHOD FOR IDENTIFYING SIMILARITIES IN DIFFERENT IMAGES

RELATED APPLICATIONS

This application is related to U.S. patent application entitled "THREAT OBJECT MAP CREATION USING A THREE-DIMENSIONAL SPHERICITY METRIC" having Ser. No. 12/467,680, filed May 18, 2009, which is incorporated herein by reference.

This application is also related to U.S. patent application entitled "IMAGE PROCESSING SYSTEM AND METHODS FOR ALIGNING SKIN FEATURES FOR EARLY SKIN CANCER DETECTION SYSTEMS" having Ser. No. 12/133,163, filed Jun. 4, 2008, which is incorporated herein by reference.

This application is also related to U.S. patent application entitled "IMAGE REGISTRATION SYSTEM AND METHOD FOR REGISTERING IMAGES FOR DEFORMABLE SURFACES" having Ser. No. 12/943,156, filed Nov. 10, 2010, which is incorporated herein by reference.

TECHNICAL FIELD

Embodiments pertain to a system and method for identifying images, and more particularly to a system and method for identifying similarities in different images.

BACKGROUND

Digital images can be manipulated in a variety of ways while maintaining their content. There are a number of applications where it is important to be able to determine if a particular image may have been manipulated from a source image.

As examples, a source image may have been manipulated by any combination of rescaling, distortion, warping, skewing, cropping, rotation, mirroring, recoloring, the addition of text or watermark, steganography, noise addition, image format changes, or image metadata changes. Some typical applications where there is a need to determine if a source image has been manipulated include copyright enforcement and image forensics.

BRIEF DESCRIPTION OF THE DRAWINGS

FIGS. 2E and 2F are examples of cluster maps generated from the images shown in FIGS. 2A and 2B in accordance with some embodiments;

FIGS. 2G and 2H are examples of sorted cluster maps generated from the images shown in FIGS. 2A and 2B in accordance with some embodiments;

FIG. 7 illustrates a system for identifying similarities in different images in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
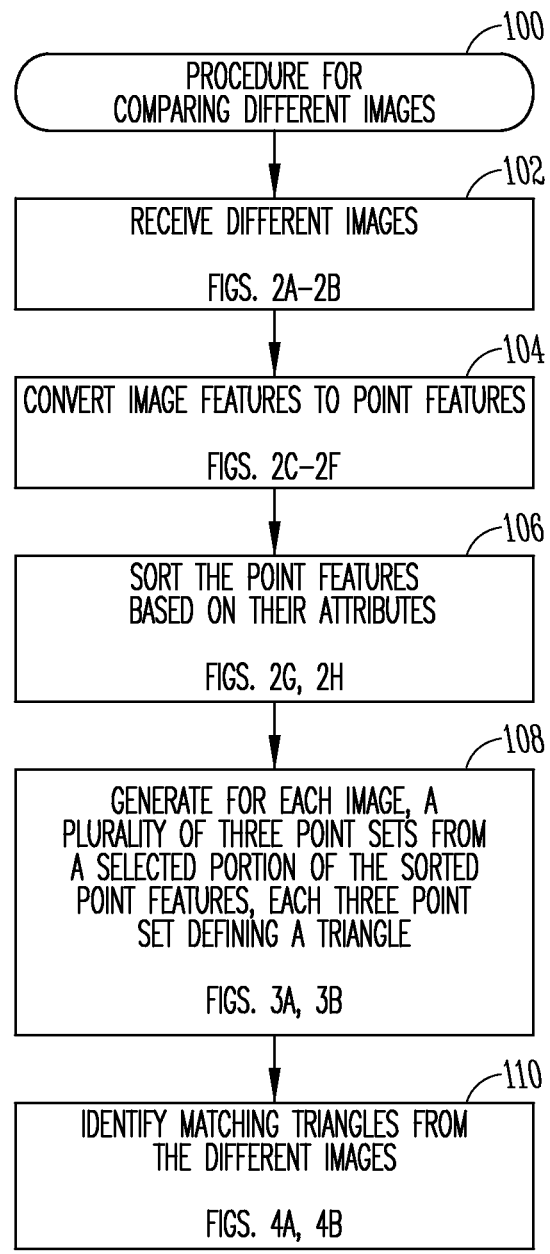
FIG. 1 is flow chart of a procedure for identifying similarities in different images in accordance with some embodiments.

FIG. 1 is a flow chart of a procedure method for identifying similarities in different images. Procedure 100 may be to compare different images where either, or both, of the images may have been manipulated by any combination of rescaling, cropping, warping, skewing, distortion, rotation, mirroring, recoloring, the addition of text or watermark, steganography, noise addition, image format changes, or image metadata changes, although the scope of the embodiments is not limited in this respect.

Operation 102 comprises receiving different images where either, or both, of the images may have been manipulated.

Operation 104 comprises converting image features of the different images to clusters. The clusters may be identified as high-contrast regions of the images.

Operation 106 comprises sorting the clusters from the different images based on one or more attributes of the clusters. The attributes may include contrast level and size.

Operation 108 comprises generating a plurality of three-point sets for each of the different images from a selected portion of the sorted clusters. Each three-point set defines a triangle in the image space.

Operation 110 comprises identifying matching triangles from the different images. One of several triangle-matching techniques may be used. The corresponding clusters of the matching triangles establish whether there are similarities between the different images.

Figure 2A:
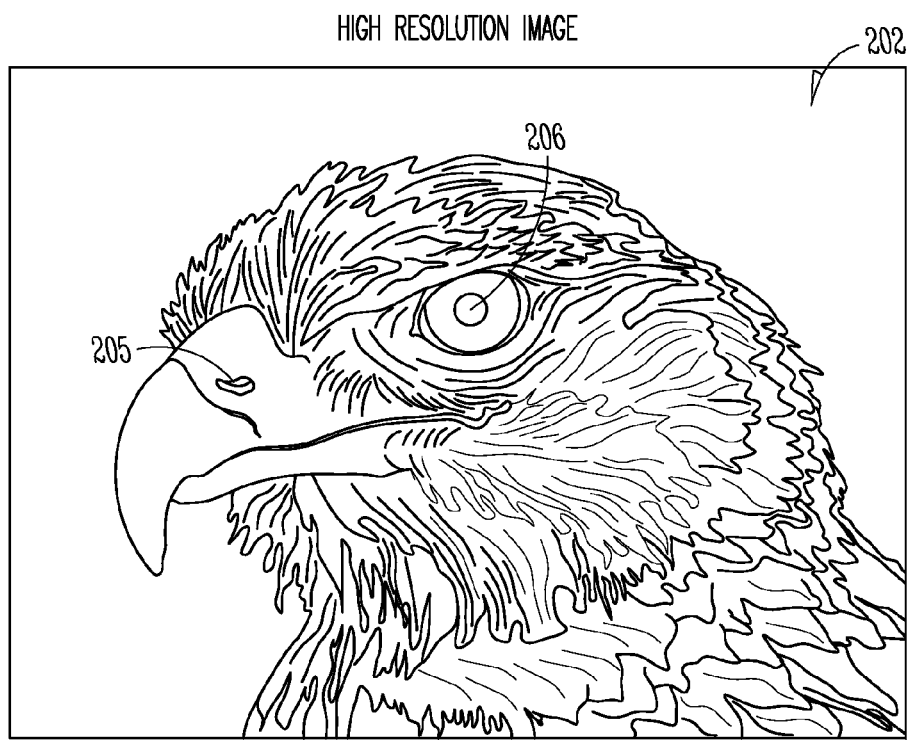
FIGS. 2A and 2B are examples of different initial images for identifying similarities in the different images in accordance with some embodiments.
Figure 2B:
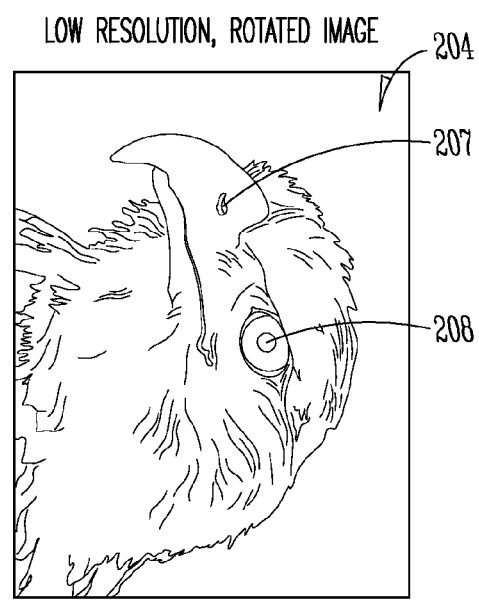

FIGS. 2A and 2B are examples of corresponding different images to be compared in accordance with some embodiments. Either, or both, of the different images 202, 204 may have been manipulated by any combination of rescaling, cropping, distortion, warping, skewing, rotation, mirroring, recoloring, the addition of text or watermark, steganography, noise addition, image format changes, or image metadata changes. In accordance with some embodiments, image features 205, 206, 207, 208 in each of the different images 202, 204 may be converted to clusters.

Figure 2C:
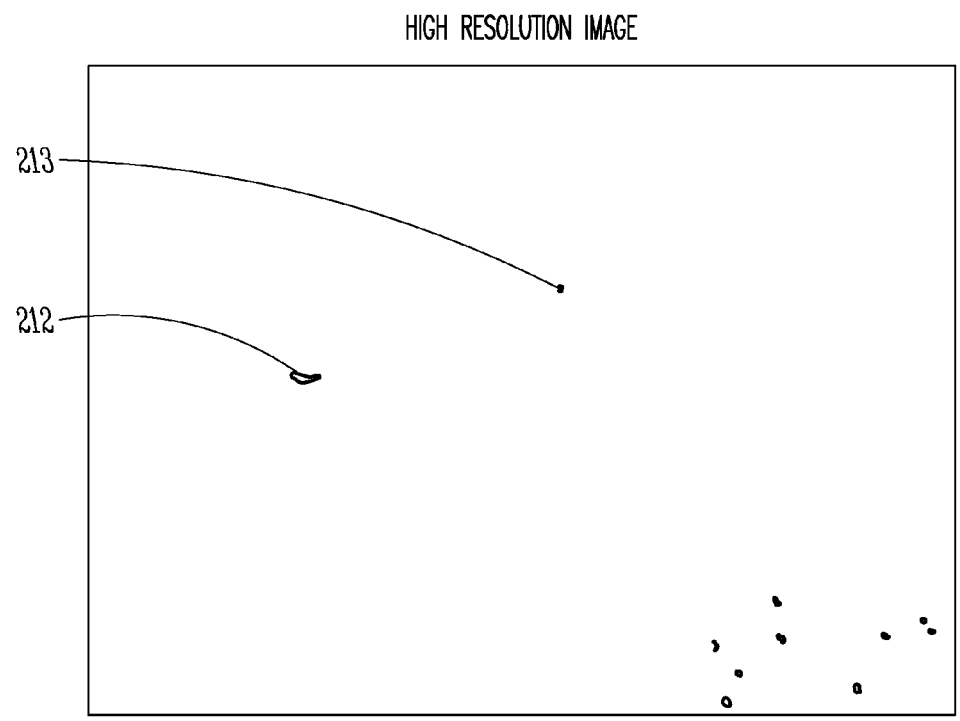
FIGS. 2C and 2D are examples of clusters generated from the different initial images in accordance with some embodiments.
Figure 2D:
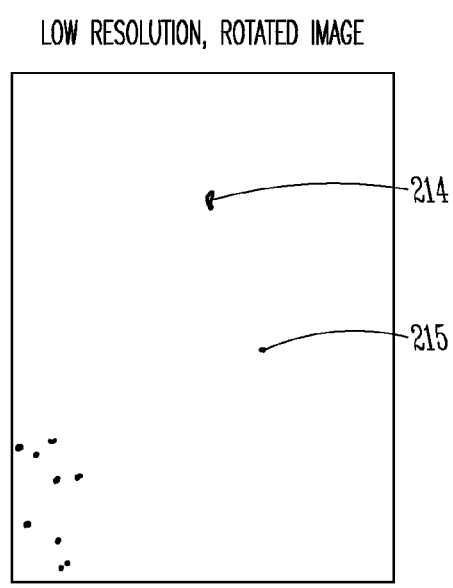

FIGS. 2C and 2D are examples of clusters generated from the corresponding different images 202, 204 in accordance with some embodiments. The clusters 212, 213, may be generated from image 202 and may be sorted based on one or more attributes of the clusters 212, 213. The clusters 214, 215, may be generated from image 204 and may be sorted based on one or more attributes of the clusters 214, 215.

In some embodiments, the clusters 212, 213 may be sorted based on an average contrast level and size of each of the clusters 212, 213. In addition, the clusters 214, 215 may be sorted based on an average contrast level and size of each of the clusters 214, 215. Corresponding clusters 212, 214 and corresponding clusters 213, 215 may be identified as part of the image comparison described herein.

In some embodiments, image 202 may be converted to corresponding clusters 212, 213 whose attributes may be converted to cluster maps (as shown in FIG. 2E). In addition, image 204 may be converted to corresponding clusters 214, 215 whose attributes may be converted to cluster maps (as shown in FIG. 2F). Each cluster 212, 213 in the cluster map illustrated in FIG. 2E may correspond to one of the clusters 214, 215 in the cluster map illustrated in FIG. 2F.

In these embodiments, the different images 202, 204 may be converted from color images to gray-scale images, and clusters 212, 213, 214, 215 may be extracted based on the contrast change between nearby pixels. Each cluster 212, 213, 214 215 may correspond to a region in one of the initial images 202, 204 having a high change in contrast. Each cluster 212, 213, 214, 215 may be selected for inclusion in one of the cluster maps shown in FIG. 2E and FIG. 2F based on a change in contrast between nearby pixels (e.g., when the change in contrast between a number of pixels exceeds a threshold) and/or based on the extent (i.e., size) of the cluster. In these embodiments, clusters 212, 213, 214, 215 below a predetermined size or extent may be ignored because they may be too small to be easily matched, and clusters 212, 213, 214, 215 above a predetermined size may be ignored because they may be too large to be meaningfully centroided. In these embodiments, clusters that are either larger or smaller than a predetermined size range may be eliminated. Each cluster 212, 213, 214, 215 may be represented, for example, by image coordinates in image space (e.g., an X-Y coordinate of the cluster's center), an average contrast level of the cluster and a cluster size (e.g., number of pixels).

In some embodiments, a weighting factor may be generated for each of the clusters 212, 213, 214, 215. The weighting factor may be based on the average contrast level of the cluster 212, 213, 214, 215 and the size of the cluster 212, 213, 214, 215. In some embodiments, the average contrast level and the size of the cluster 212, 213, 214, 215 may be multiplied together to determine the weighting factor for the cluster 212, 213, 214, 215 although this is not a requirement as other weighting factors may be suitable. The clusters 212, 213, 214, 215 may be sorted based on the weighting factor and the sorted clusters (as shown in FIGS. 2G-2H) may be used to generate three-point sets, described in more detail below.

In some embodiments, prior to sorting the clusters in the cluster maps shown in FIGS. 2E-2F, clusters that exceed a predetermined size may be eliminated. In these embodiments, regions of an image that may be incorrectly identified as a cluster may be excluded from the cluster maps. For example, any boundary line features that extend beyond a given number of pixels in extent may have a high change in contrast. These types of edges are not considered clusters, so they are excluded from the cluster maps shown in FIGS. 2E-2F.

The cluster map that is depicted in FIG. 2E may be sorted to produce the cluster map shown in FIG. 2G. In addition, the cluster map that is depicted in FIG. 2F may be sorted to produce the cluster map shown in FIG. 2H.

Figure 3A:
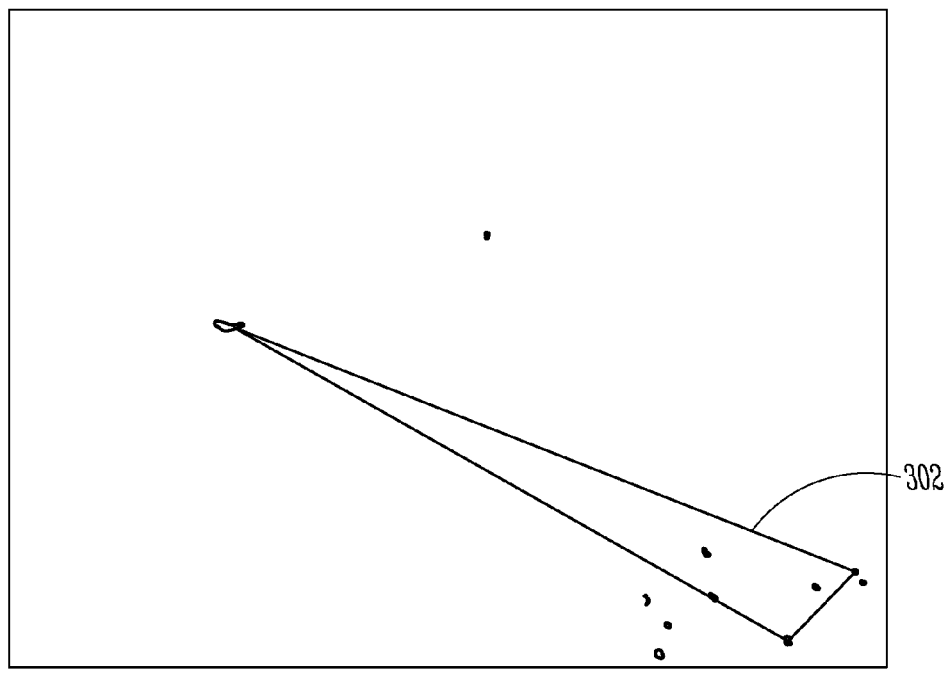
FIGS. 3A and 3B are examples of three-point sets in accordance with some embodiments.
Figure 3B:
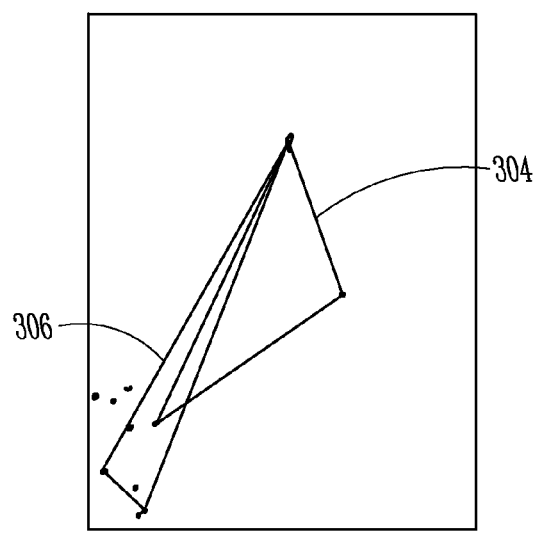

FIGS. 3A and 3B are examples of three-point sets in accordance with some embodiments. A plurality of three-point sets 302 and 304 may be generated from a selected portion of the sorted clusters. Each three-point set 302 may define a triangle. In some embodiments, a predetermined number of the sorted clusters may be used to generate the three-point sets 302. In this way, many of the clusters can be excluded from use generating a limited number of the three-point sets 302 that define triangles. Furthermore, clusters with similar average contrast levels and similar size may be used to generate the three-point sets 302 that define triangles.

As discussed in more detail below, matching triangles 302, 306 may be identified from the different images 202, 204. Corresponding clusters (FIGS. 2C and 2D) of the matching triangles 302, 306 may represent corresponding image features (FIGS. 2A and 2B).

In some embodiments, identifying the matching triangles 302, 306 from the different images 202, 204 may include applying a sphericity algorithm to pairs of nearest-neighbor triangles 302 or 306 from the corresponding images 202, 204 to determine the degree to which corresponding triangles match. The matching triangles 302, 306 may include triangles from the different images 202, 204 that have sphericity above a predetermined threshold.

In some alternate embodiments, the matching triangles 302, 306 may be identified from the different images 202, 204 by applying a weighted centroid algorithm or an inscribed circle algorithm to pairs of triangles 302, 306 from the different images 202, 204 to determine when a pair of triangles 302, 306 matches.

In accordance with some embodiments, the vertices of the matching triangles 302, 306 may correspond to corresponding clusters in the different images 202, 204, which may be used to compute a score that assesses the similarity of the different images 202, 204. These embodiments are described in more detail below.

In some embodiments, constellations of high-confidence triangles may be generated to identify additional corresponding clusters and to increase the confidence level of the corresponding clusters identified by matching triangles.

Figure 4A:
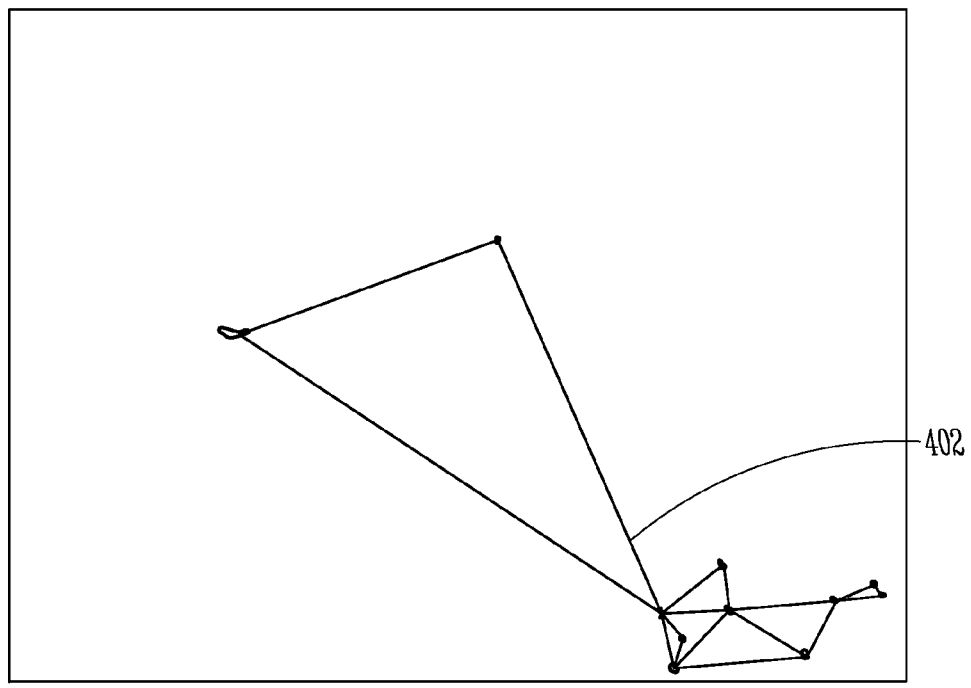
FIGS. 4A and 4B illustrate a high-confidence constellation of triangles in accordance with some embodiments.
Figure 4B:
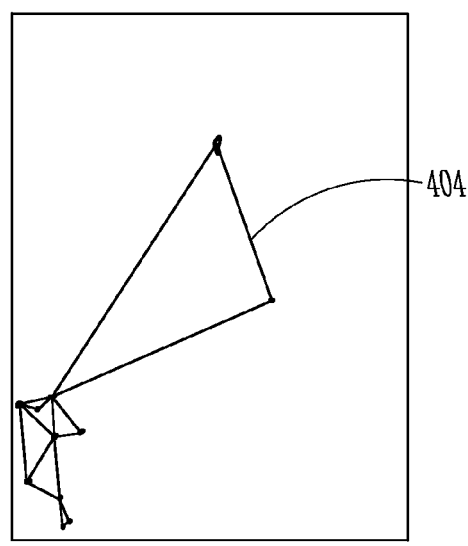

FIGS. 4A and 4B illustrate high-confidence constellations 402, 404 of triangles in accordance with some embodiments. In these embodiments, a constellation of high-confidence triangles may be generated for each cluster map (see, e.g., cluster maps in FIGS. 2C and 2D). High-confidence triangles may be added and low-confidence triangles may be eliminated. High-confidence triangles may comprise corresponding triangles generated from corresponding cluster maps of different images 202, 204 that match (e.g., have a sphericity above a predetermined threshold or are matched by some other measure), and low-confidence triangles may be triangles that do not match.

In these embodiments, the high-confidence constellations 402, 404 of triangles may be accumulated by testing assertions of correspondence between selectively added point-features. Clusters (and in some embodiments, triangles) may be added one at a time to one image, producing triangles which may be tested using a triangle-matching technique (e.g., sphericity). Sphericity may then be used to determine the likelihood of a feature match with a corresponding point feature (or triangle) from the other image. In these embodiments, each point feature (or triangle) added may result in many triangles to measure and compare. Although each of these added triangles may be measured and compared, this is not necessary as only a few such comparisons may need to be made in order to either determine correspondence matching clusters with a high degree of confidence or dismiss candidate clusters that do not match. This process results in the generation of high-confidence constellations 402, 404.

Figure 5:
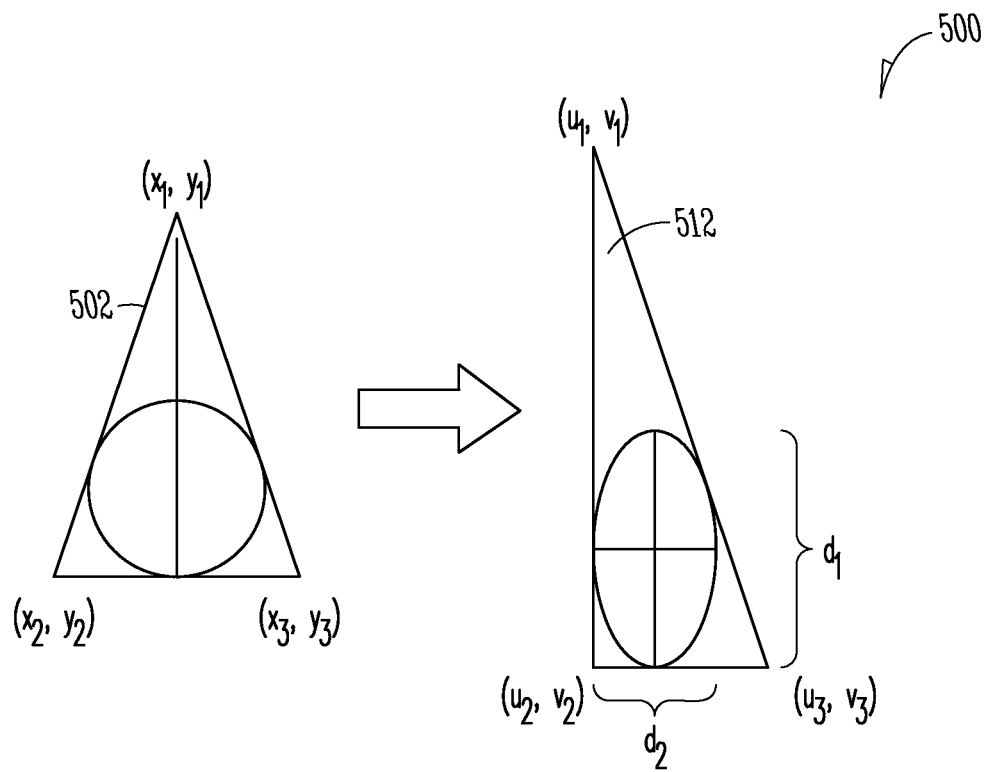
FIG. 5 illustrates the application of a sphericity algorithm to identify matching triangles in accordance with some embodiments.

FIG. 5 illustrates the application of a sphericity algorithm to identify matching triangles in accordance with some embodiments. The sphericity of triangles 502 and 512 is illustrated by equation 504. Triangles, such as matching triangles 302, 306 (FIGS. 3A and 3B), generated from corresponding sorted cluster maps (FIGS. 2G, 2H) that have a sphericity above a predetermined threshold may be designated as matching triangles and may contribute to an accumulated similarity score between the different images 202, 204.

In some embodiments, the sphericity algorithm may be a two-dimensional sphericity algorithm that comprises determining the similarity between pairs of the triangles 302, 304 by inscribing a circle in a first triangle 502, translating the coordinates of the circle to a second triangle 512 to generate an ellipse inscribed in the second triangle 512, and determining the sphericity of the second triangle 512 based on lengths of the major and minor axes of the ellipse. In these embodiments, a higher sphericity results when the lengths of the major and minor axes of the ellipse are closer to unity and therefore the triangles more closely fit the mathematical definition of being similar (i.e., similar triangles have identical interior angles). In some embodiments, the sphericity may be calculated based on the following equation 504:

$$\text{Sphericity} = 2\frac{\sqrt{d_1 d_2}}{d_1 + d_2}$$

In this equation, $d_1$ and $d_2$ are the minor and major axes of the inscribed ellipse of the second triangle 512.

Sphericity is a metric that is used to assess the similarity of two triangles (or tetrahedrons, or corresponding simplex solids in any dimensional space greater than three). As an example, a comparison of triangle 302 and 304 would provide a lower score than a comparison of triangle 302 and 306.

As a practical matter the foregoing computation is implemented as matrix math as follows. For the two-dimensional computation used in connection with the present invention, in which one triangle is compared to another triangle, the sphericity of the resulting ellipse is computed as:

$$S = \frac{(\det(g'g))^{1/n}}{\frac{1}{n}tr(g'g)}$$

Where:

$$B = \begin{bmatrix} x_1 & y_1 & 1 \\ x_2 & y_2 & 1 \\ x_3 & y_3 & 1 \end{bmatrix}$$

and:

$$\begin{bmatrix} g_{11} & g_{12} \\ g_{21} & g_{22} \\ t_1 & t_2 \end{bmatrix} = B^{-1} \begin{bmatrix} u_1 & v_1 \\ u_2 & v_2 \\ u_4 & v_3 \end{bmatrix}$$

Referring to FIG. 3, the system selects (either arbitrarily, or through some other selection process), a starting triangle 302 from FIG. 3A. It then selects a candidate triangle 304 from FIG. 3B and computes the sphericity of this match. If the sphericity is below some threshold indicating that the points are substantially collinear the triangle may be discarded, and another selected. If the sphericity is sufficiently high (for example, about 0.7 in the illustrated case), the system continues attempting to match triangles.

The system continues as above for various combinations of clusters points in the sorted cluster maps shown in FIGS. 2G, 2H, thereby producing a number of similarity scores. Using any suitable criteria, a cumulative similarity score is used to select high-confidence constellations. In one embodiment, for example, the average sphericity for the sum of triangle comparisons is used.

As shown in FIGS. 4A and 4B, for example, the accumulated high scoring triangles may form high scoring constellations of clusters with an average sphericity close to 1.0. As an example, a low scoring constellation of clusters might have an average score less than 0.7. In a high scoring constellation comparison, the degree of similarity between the two images is said to be high, and it can be argued that high scoring image comparisons are those with similar content.

Figure 6:
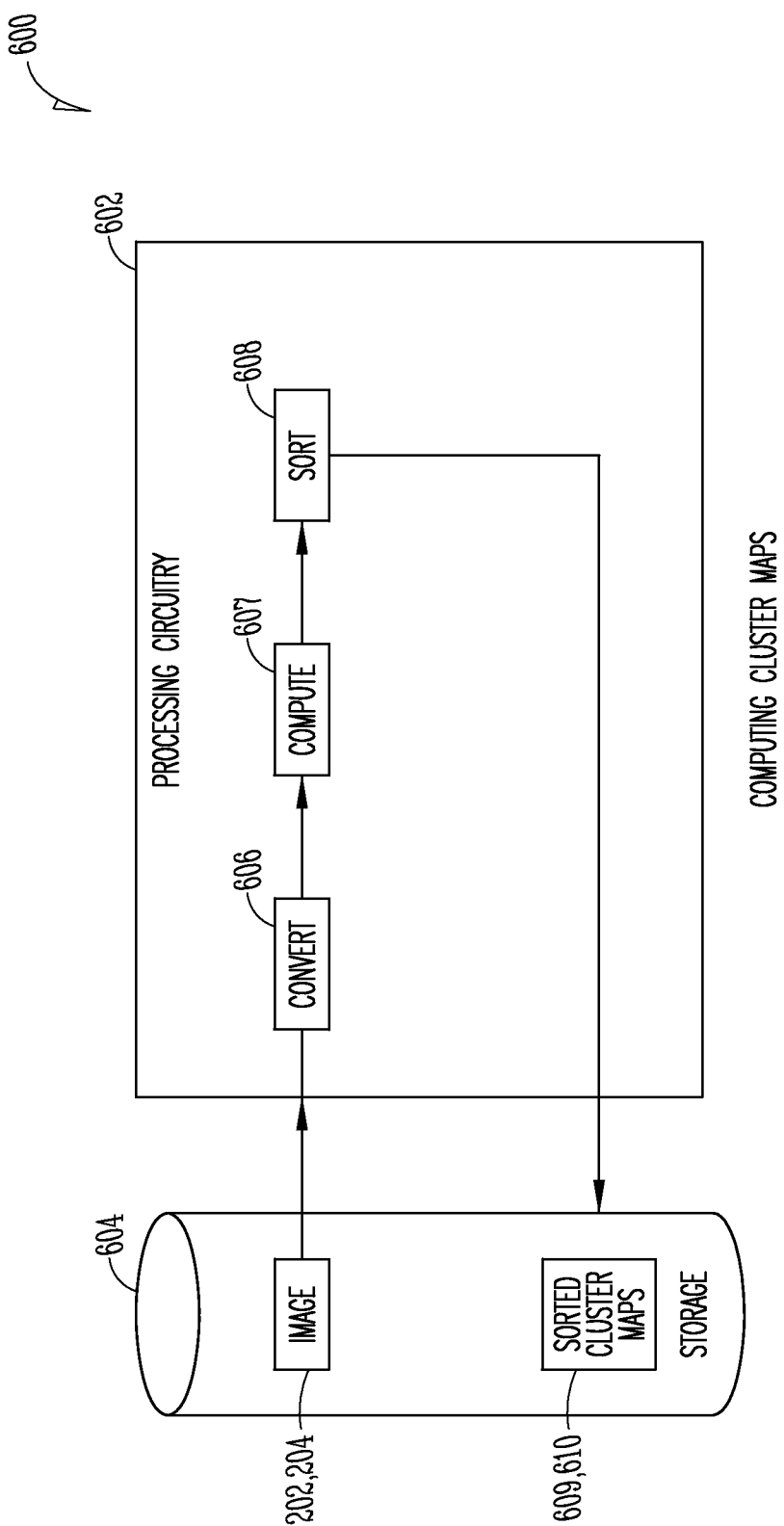
FIG. 6 illustrates a system for computing cluster maps.

FIG. 6 illustrates a system for computing sorted cluster maps 609, 610 (see, e.g., cluster maps shown in FIGS. 2G and 2H) in accordance with some embodiments. System 600 may include storage element 604 and processing circuitry 602. Storage element 604 may store different images (e.g., images 202, 204 shown in FIGS. 2A and B). Processing circuitry 602 may be configured to generate sorted cluster maps 609, 610 that correspond to the different images 202, 204. Storage element 604 may also be configured to store the sorted cluster maps 609, 610.

In some embodiments, the processing circuitry 602 may be configured to perform the various operations described herein for sorted cluster map generation. In some embodiments, the processing circuitry 602 may include circuitry to (i) convert 606 the image features 205, 206, 207, 208 of the different images 202, 204 (see, e.g., images and features shown in FIGS. 2A and 2B) to clusters (see, e.g., clusters 212, 213 shown in FIG. 2C and clusters 214, 215 and shown in FIG. 2D); (ii) compute 607 weighting factors from one or more attributes of the clusters 212, 213, 214, 215; and (iii) sort 608 the clusters 212, 213 for one image 202 and sort 608 clusters 214, 215 from image 204 based on one or more attributes of the clusters 212, 213, 214, 215 to generate sorted cluster map 609 from clusters 212, 213 and cluster map 610 from clusters 214, 215.

FIG. 7 illustrates a system for identifying similarities in different images in accordance with some embodiments. System 700 may include storage element 704 and processing circuitry 702. Storage element 704 may store different cluster maps (e.g., cluster maps 609, 610) that correspond to the image features 205, 206, 207, 208 in different images 202, 204. Processing circuitry 702 may be configured to calculate an accumulated similarity score 705 that represents the degree of similarity between the different images 202, 204 that yielded the corresponding cluster maps 609, 610. Storage element 704 may also be configured to store the accumulated similarity score 705 that represents the degree of similarity between the cluster maps 609, 610 that correspond to the different images 202, 204.

In some embodiments, the processing circuitry 702 may be configured to perform the various operations described herein for identifying similarities in different images. The processing circuitry 702 may also include circuitry to select 710 a portion of the sorted cluster maps 609, 610, and circuitry to generate and identify 712 a plurality of three-point sets 302 from a selected portion of the highest weighted clusters in each of the cluster maps 609, 610. As discussed above, each three-point set may define a triangle.

The processing circuitry 702 to generate and identify 712 may identify matching triangles (see, e.g., triangles 302, 306 in FIGS. 3A and 3B) from the corresponding sorted cluster maps 609, 610. The processing circuitry 702 may also include circuitry to compute 714 an accumulated similarity score 705 based on the matching triangles 302, 306. In some embodiments, the processing circuitry 702 may include one or more processors and may be configured with instructions stored on a computer-readable storage device.

Although system 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs) and combinations of various hardware and logic circuitry for performing at least the functions described herein. In some embodiments, the functional elements of system 700 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The Abstract is provided to comply with 37 C.F.R. Section 1.72(b requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for identifying similarities in different images, the method comprising using one or more processors configured to:
    converting image features of the different images to clusters, wherein one of the different images is a source image and other image is a manipulation of the source image;
    sorting the clusters based on one or more attributes of the clusters;
    generating, for each of the different images, a plurality of three-point sets from a selected portion of the sorted clusters, each three-point set defining a triangle; and
    identifying matching triangles from the different images, wherein corresponding clusters of the matching triangles establish whether there are similarities between the different images, and wherein the other image that is a manipulation of the source image was subject to any combination of the following manipulations: rescaling, warping, distortion, skewing, cropping, rotation, mirroring, recoloring, addition of text or watermark, noise addition, a format change, steganography, and metadata changes.

2. The method of claim 1, wherein sorting the clusters comprises sorting the clusters based on an average contrast level and size of each of the clusters, and
    wherein the method further comprises selecting a predetermined number of the sorted clusters for use in generating the three-point sets.

3. The method of claim 2, wherein generating the plurality of three-point sets comprises generating nearest-neighbor triangles, and
    wherein identifying matching triangles from the different images comprises identifying matching nearest-neighbor triangles.

4. The method of claim 3, wherein identifying the matching triangles from the different images comprises:
    applying a sphericity algorithm to pairs of nearest-neighbor triangles from the different images to determine when corresponding triangles match,
    wherein the matching triangles include nearest-neighbor triangles from the different images that have a sphericity above a predetermined threshold.

5. The method of claim 3, wherein identifying the matching triangles from the different images comprises:
    applying a weighted centroid algorithm or an inscribed circle algorithm to pairs of nearest-neighbor triangles from the different images to determine when a pair of nearest-neighbor triangles matches.

6. The method of claim 2, wherein generating the plurality of three-point sets comprises considering all possible groups of three-point sets and determining matching triangles in the different images.

7. The method of claim 6, wherein determining matching triangles in the different images comprises:
    applying a sphericity algorithm to pairs of triangles from the different images to determine when corresponding triangles match,
    wherein the matching triangles include triangles from the different images that have a sphericity above a predetermined threshold.

8. The method of claim 1, wherein converting the image features of the different images to clusters comprises converting the different images to corresponding cluster maps comprised of a plurality of clusters, wherein each cluster corresponds to one of the clusters.

9. The method of claim 8, wherein each cluster corresponds to a region in one of the images having a high change in contrast,
    wherein each cluster is selected for inclusion in one of the cluster maps based on a change in contrast between nearby pixels, and
    wherein each cluster is represented by image coordinates of the cluster's centroid, an average contrast level of the cluster and a cluster size.

10. The method of claim 9, wherein sorting the clusters comprises sorting the clusters of each of the cluster maps based on a weighting factor for each cluster,
    wherein prior to sorting the clusters, the method comprises:
        generating the weighting factor for each of the clusters based on the average contrast level of the cluster and the size of the cluster; and
        eliminating clusters that are either larger or smaller than a predetermined size range.

11. The method of claim 10, wherein the matching triangles comprise corresponding triangles generated from corresponding cluster maps that have a sphericity above a predetermined threshold, and
    wherein the method further comprises eliminating low-confidence triangles of the triangles to generate a constellation of high-confidence triangles for each cluster map.

12. The method of claim 11, wherein the sphericity is determined by a two-dimensional sphericity algorithm that comprises determining a similarity of pairs of the triangles of the cluster maps by:
    inscribing a circle in a first triangle;
    translating coordinates of the circle to a second triangle to generate an ellipse inscribed in the second triangle; and
    determining the sphericity of the second triangle based on lengths of major and minor axes of the inscribed ellipse.

13. The method of claim 12, further comprising:
generating a constellation of high-confidence triangles from candidate corresponding clusters of the cluster maps by testing assertions of corresponding triangles; and
based on the tested assertions, either retaining or eliminating corresponding triangles from the constellation to generate a high-confidence constellation,
wherein vertices of triangles of the high-confidence constellation correspond to corresponding image locations.

14. The method of claim 1, wherein establishing whether there are similarities between the different images includes calculating an aggregate score of the similarity between the different images.

15. The method of claim 14, wherein calculating an aggregate score of the similarity between the different images includes using at least one of: a mean sphericity value, a weighted average of sphericity values, or a mean sphericity value having disposed of sphericity values below a threshold.

16. An image-registration system for identifying similarities in different images, the system comprising one or more processors configured to:
convert image features of the different images to clusters, wherein one of the different images is a source image and other image is a manipulation of the source image;
sort the clusters based on one or more attributes of the clusters;
generate, for each of the different images, a plurality of three-point sets from a selected portion of the sorted clusters, each three-point set defining a triangle; and
identify matching triangles from the different images, wherein corresponding clusters of the matching triangles establish whether there are similarities between the different images, and wherein the other image that is a manipulation of the source image was subject to any combination of the following manipulations: rescaling, warping, distortion, skewing, cropping, rotation, mirroring, recoloring, addition of text or watermark, noise addition, a format change, steganography, and metadata changes.

17. The system of claim 16, further comprising a computer-readable storage device configured to store the different images,
wherein the one or more processors are configured to:
sort the clusters based on an average contrast level and size of each of the clusters; and
select a predetermined number of the sorted clusters for use in generating the three-point sets.

18. A non-transitory computer-readable storage device that stores instructions for execution by one or more processors to perform operations for identifying similarities in different images, the instructions to configure the one or more processors to:
convert image features of the different images to clusters, wherein one of the different images is a source image and other image is a manipulation of the source image;
sort the clusters based on one or more attributes of the clusters;
generate, for each of the different images, a plurality of three-point sets from a selected portion of the sorted clusters, each three-point set defining a triangle; and
identify matching triangles from the different images, wherein corresponding clusters of the matching triangles establish whether there are similarities between the different images, and wherein the other image that is a manipulation of the source image was subject to any combination of the following manipulations: rescaling, warping, distortion, skewing, cropping, rotation, mirroring, recoloring, addition of text or watermark, noise addition, a format change, steganography, and metadata changes.

* * * * *